US008452593B2

(12) United States Patent
Huang et al.

(10) Patent No.: US 8,452,593 B2
(45) Date of Patent: May 28, 2013

(54) PROJECTION APPARATUS WITH SPEECH INDICATION AND CONTROL METHOD THEREOF

(75) Inventors: Yi-Hsiang Huang, Taoyuan Hsien (TW); Yuan Ming Hsu, Taoyuan Hsien (TW); Jimmy Su, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 999 days.

(21) Appl. No.: 11/848,483

(22) Filed: Aug. 31, 2007

(65) Prior Publication Data

US 2008/0300883 A1    Dec. 4, 2008

(30) Foreign Application Priority Data

May 30, 2007 (TW) ................................ 96119288 A

(51) Int. Cl.
*G10L 15/00* (2006.01)
*G10L 15/26* (2006.01)
*G10L 15/06* (2006.01)
*G10L 13/08* (2006.01)
*G10L 13/00* (2006.01)
*G10L 21/00* (2006.01)

(52) U.S. Cl.
USPC ........... 704/231; 704/235; 704/243; 704/246; 704/260; 704/261; 704/270; 704/270.1; 704/275

(58) Field of Classification Search
USPC .............. 704/270, 270.1, 275, 260, 274, 231, 704/246, 261, 235, 243
See application file for complete search history.

(56) References Cited

U.S. PATENT DOCUMENTS

| | | | |
|---|---|---|---|
| 4,951,045 A | 8/1990 | Knapp et al. | |
| 5,374,924 A * | 12/1994 | McKiel, Jr. ................... | 715/729 |
| 6,088,673 A * | 7/2000 | Lee et al. ...................... | 704/260 |
| 6,115,482 A * | 9/2000 | Sears et al. .................... | 382/114 |
| 6,424,357 B1 * | 7/2002 | Frulla et al. .................. | 715/728 |
| 6,965,862 B2 * | 11/2005 | Schuller ........................ | 704/258 |
| 7,318,198 B2 * | 1/2008 | Sakayori et al. .............. | 715/729 |
| 7,480,865 B2 * | 1/2009 | Lin ................................ | 715/727 |
| 7,728,826 B2 * | 6/2010 | Miyata .......................... | 345/204 |
| 2003/0001820 A1 * | 1/2003 | Hou ............................... | 345/168 |
| 2003/0049015 A1 * | 3/2003 | Cote et al. ...................... | 386/54 |
| 2004/0001002 A1 * | 1/2004 | Blum et al. ................. | 340/573.1 |

(Continued)

FOREIGN PATENT DOCUMENTS

CN    1837943    9/2006

OTHER PUBLICATIONS

Prior art reference CN1873943A v. Claimed Invention.

(Continued)

*Primary Examiner* — Edgar Guerra-Erazo
(74) *Attorney, Agent, or Firm* — Grossman, Tucker, Perreault & Pfleger, PLLC

(57) ABSTRACT

A projection apparatus with speech indication and a control method thereof are provided. The projection apparatus comprises a storage unit, a transmission interface, a process unit, and an output unit. The storage unit is configured to store a plurality of speech data. The transmission interface is configured to connect to an external apparatus for accessing the storage unit. The process unit is configured to select at least one of the speech data according to the present state of the projection apparatus. The output unit is configured to output the selected speech datum to broadcast the speech indication.

10 Claims, 3 Drawing Sheets

U.S. PATENT DOCUMENTS

| | | |
|---|---|---|
| 2004/0234250 A1* | 11/2004 | Cote et al. ............... 386/96 |
| 2004/0236574 A1* | 11/2004 | Ativanichayaphong et al. ............... 704/231 |
| 2006/0047513 A1* | 3/2006 | Chen ............... 704/246 |
| 2006/0116884 A1* | 6/2006 | Itaki et al. ............... 704/271 |
| 2006/0224386 A1* | 10/2006 | Ikegami ............... 704/260 |
| 2007/0242233 A1* | 10/2007 | Sokeila et al. ............... 353/69 |
| 2008/0082179 A1* | 4/2008 | Yang ............... 700/17 |
| 2010/0179991 A1* | 7/2010 | Lorch et al. ............... 709/206 |

OTHER PUBLICATIONS

Office Action from corresponding Taiwanese Application No. 096119288 dated Jun. 24 2010. English machine translation attached.

* cited by examiner

109

| Main | Setup | Config | Utility | Language | Status |
|------|-------|--------|---------|----------|--------|
| English ||||||
| French ||||||
| German ||||||
| Italian ||||||
| Spanish ||||||
| Chinese ||||||
| Japanese ||||||

PROJECTION APPARATUS WITH SPEECH INDICATION AND CONTROL METHOD THEREOF

This application claims the benefit of priority based on Taiwan Patent Application No. 096119288 filed on May 30, 2007, disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a projection apparatus and a method thereof. More particularly, the present invention involves a projection apparatus with speech indication and a method thereof.

2. Descriptions of the Related Art

In modern society, the sharing of ideas in public settings comes in various forms, such as meetings, presentations, classes and workshops. Projection apparatuses are often used in these situations to enable the presenter to better express his or her ideas to the audience.

A commonly used projection apparatus is the fixed type. The fixed type projection apparatus is generally mounted on the ceilings or on other high locations, and typically has indication devices (e.g., LEDs) for indicating the operation states of the projecting apparatus to the user. For example, when a failure occurs in the projection apparatus, an LED will emit a light to indicate this to the user. As another example, when the projection apparatus is warming up in preparation for normal operation, an LED will emit light to also indicate this to the user, so that the user will not repeatedly turn the apparatus on and off. However, due to its mounting location, the user may simply be unaware of such an indication light or cannot understand what each light means, and therefore, cannot make proper operations in response to the current state of the apparatus.

To solve this problem, a projection display apparatus and a method for delivering speech indications are provided in the public specification of China patent application No. 200510055760.3. In this method, the user is informed of situations, such as overheating, abnormal bulbs or fan failure, through corresponding speech indications. However, such speech indication data are pre-stored in the projection display apparatus, and therefore, cannot be updated.

Thus, it is important to provide a projection apparatus that has an indication device for expressly indicating the operating state thereof. In addition, the speech indication data should be updatable. Lastly, the user should be able to know the current operation state at any time, regardless of the projection apparatus's mounting location.

SUMMARY OF THE INVENTION

One objective of this invention is to provide a projection apparatus with speech indication. This projection apparatus can deliver speech indications to the user to let him know the current state (e.g., overheating, blacked out bulb, and removal) of the apparatus without need of visual observation.

This invention discloses a projection apparatus with speech indication, which comprises a storage unit, a transmission interface, a process unit and an output unit. The storage unit is configured to store a plurality of speech data; the transmission interface is configured to connect to an external apparatus for enabling the external apparatus to update the plurality of speech data; the process unit is configured to select at least one of the speech data according to a present state of the projection apparatus; and the output unit is configured to output at least one selected speech datum to broadcast at least one speech.

This invention further discloses a control method for use in a projection apparatus with speech indication. The projection apparatus comprises a storage unit, a process unit and an output unit, wherein the storage unit is configured to store a plurality of speech data. The control method comprising the following steps: enabling the process unit to select at least one of the speech data according to a state of the projection apparatus; and enabling the output unit to output the at least one selected speech datum.

As compared to the conventional projection apparatus, the present invention immediately informs the user of the current operational state, regardless of the projection apparatus's mounting location.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2 is a schematic diagram of an on screen display (OSD) interface of the first embodiment of this invention.

DESCRIPTION OF THE PREFERRED EMBODIMENT

Figure 1:
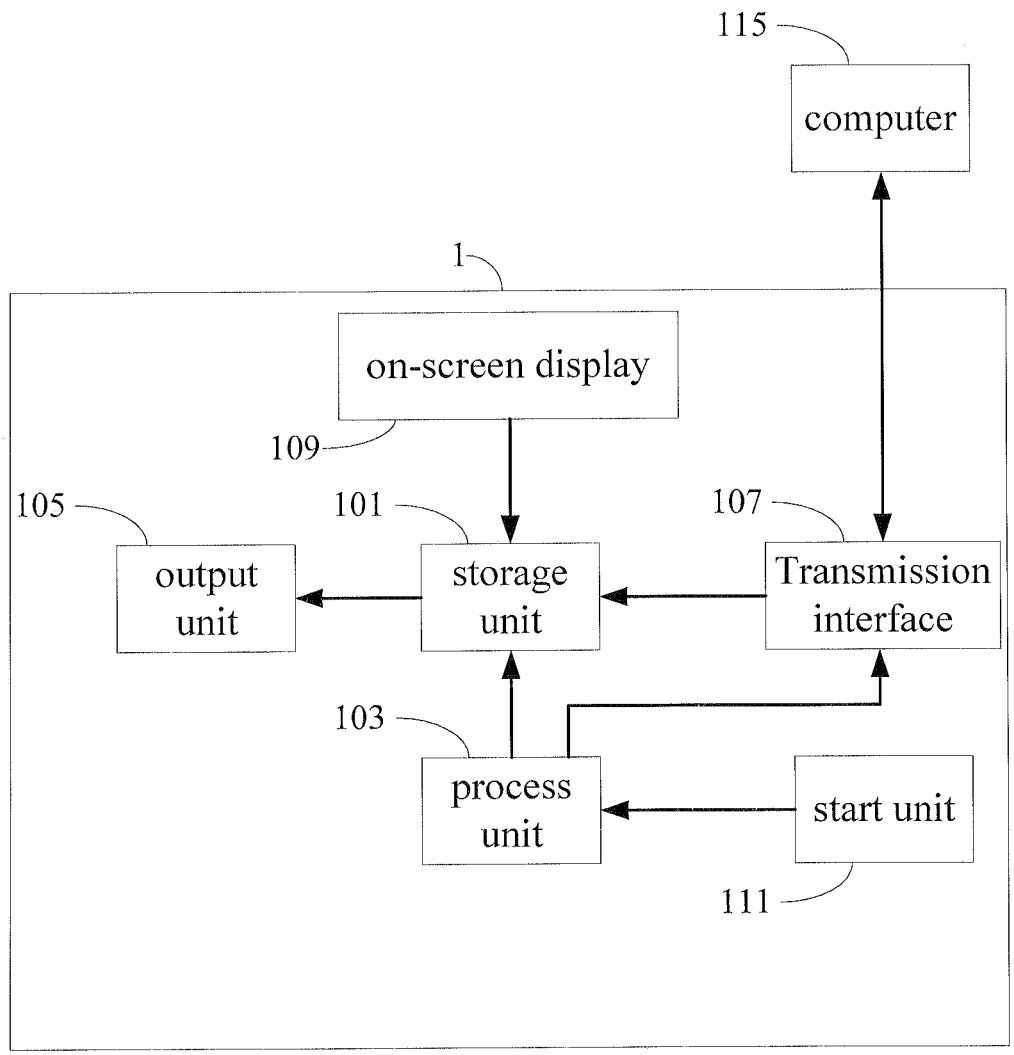
FIG. 1 is a schematic diagram of the first embodiment of this invention.

FIG. 1 depicts a projection apparatus 1 with speech indication in the preferred embodiment. The projection apparatus 1 comprises a storage unit 101, a process unit 103, an output unit 105, a transmission interface 107, an OSD interface 109 and a starting unit 111. The storage unit 101 is configured to store a plurality of speech data, including a plurality of different language groups (e.g., Chinese, English, Japanese, French, and etc.) and various speech indication content (e.g., turning on, turning off, blacked out bulb, overheating, and etc.). Depending on the actual conditions, there may be more or fewer languages or speech indication content, and thus, the scope of this invention is not limited to the specifications listed here. The process unit 103 is configured to select a corresponding speech datum from the storage unit 101 according to the present state of the projection apparatus 1. The output unit 105 comprises a speaker for broadcasting the selected speech datum when outputted.

In particular, the process unit 103 is configured to select a corresponding speech datum from the storage unit 101 according to the operating state (e.g., turning on, turning off, blacked bulb, overheating, and etc.) of the projection apparatus 1 sensed by a state sensor (not shown). The speech data are in digital forms, so the corresponding speech data selected by the process unit 103 have to be transformed into analog forms that can be outputted by the output unit 105 through digital-to-analog transformation, such as using integration simulation of pulse-width modulation (PWM). PWM is implemented by conventional technologies and thus, is not described in detail herein. For example, once the user turns on the projection apparatus 1 and this state is detected by the process unit 103, the process unit 103 selects a speech datum corresponding to the "turning on" state from the storage unit 101. The speech datum is then transformed into analog data for transfer to the output unit 105, which then outputs the transformed speech datum upon receipt. As a result, the phrase "turning on" will be broadcasted to the user.

In this embodiment, the projection apparatus 1 can further be connected with an external device, such as a computer 105 via the transmission interface 107. The computer 105 can thereby access the storage unit 101 via the transmission interface 107 to update the speech data therein. In other words, the computer 115 can store the updated speech data into the storage unit 101, or overwrite the speech data already stored therein with updated ones. In this embodiment, the transmission interface 107 can be a standard interface such as RS232 or USB or it can also be a specific interface. The external device can be a computer, a personal digital assistant (PDA), a portable electronic device, etc. Such examples are only intended to facilitate the description of this embodiment, and are not intended to limit the scope of this invention.

In this embodiment, if the projection apparatus 1 goes into standby after being powered on, the process unit 103 operates to check if the computer 115 is going to update the speech data via the transmission interface 107. If not, the starting unit 111 can start the projection apparatus 1. If so, to avoid reading incorrect speech data, the projection apparatus 1 cannot be started by the starting unit 111 until the speech data in the storage unit 101 is completely updated, after which the projection apparatus 1 can be started by the starting unit 111.

While the projection apparatus 1 is started, the process unit 103 selects a speech indication corresponding to the state change of the projection apparatus 1 from the storage unit 101. In this embodiment, Chinese is the preset language (not shown), while the indication phrase is "Kai-Chi" in Chinese language and it means "turning on". Upon startup, the user can use a toolbar 201 in the OSD interface 109 to select a language from the language menu 200 comprising a plurality of language groups (e.g., Chinese, English, Japanese, and etc.) to be adopted by the projection apparatus 1. In this embodiment, when the user moves the cursor in the language menu 200 from Chinese to English, the OSD interface 109 will be displayed in English, shown as FIG. 2. Accordingly, when the projection apparatus 1 is shut down, an English speech indication of "shut down" will be outputted by the output unit 105 to indicate this state to the user. Such examples are only intended to facilitate the description of this embodiment, and are not intended to limit the scope of this invention.

With such configurations, the user can be informed of the present state of the projection apparatus 1 through speech indications, regardless of the projection apparatus's mounting locations.

Figure 3:
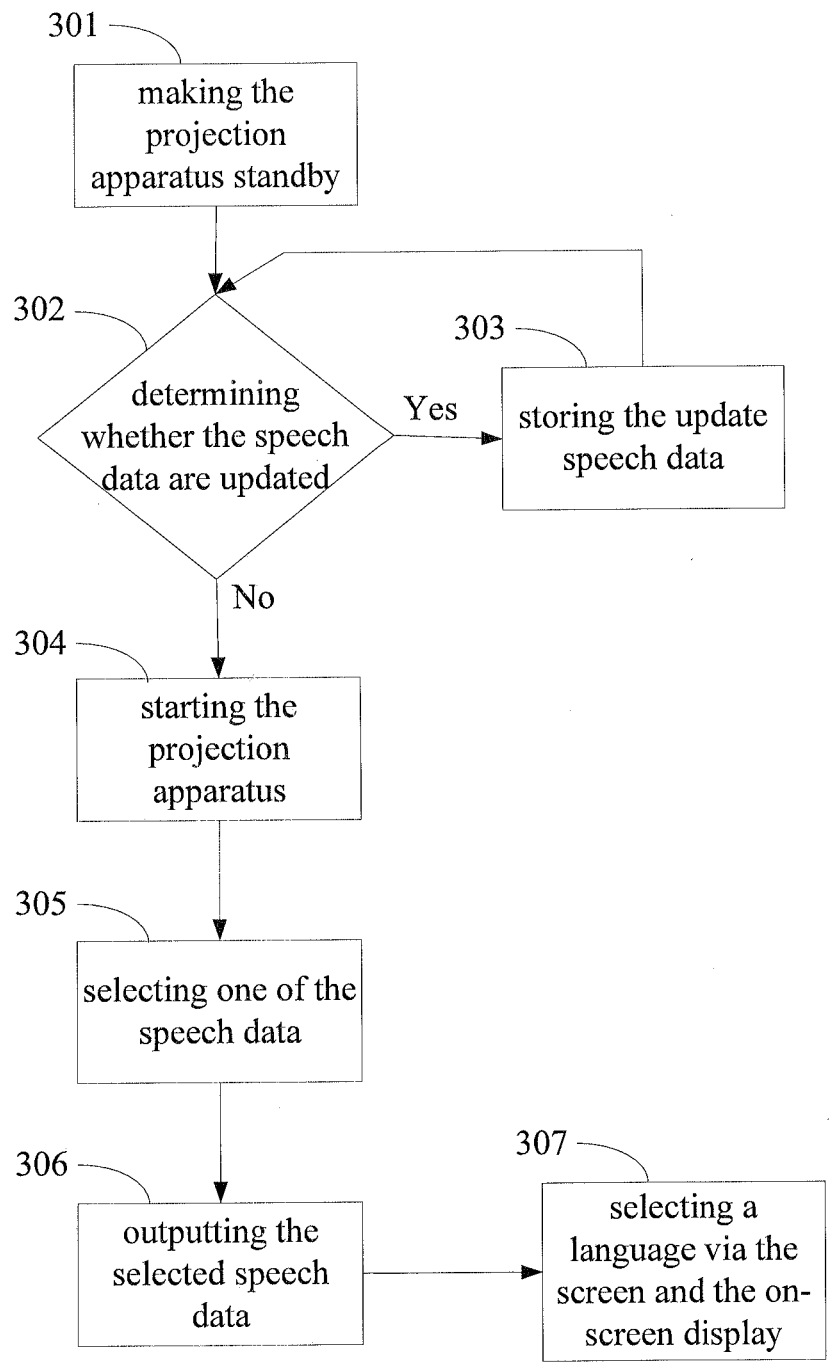
FIG. 3 is a flow chart of the second embodiment of this invention.

Another preferred embodiment of this invention is a control method for use in the aforementioned projection apparatus 1. A flow chart of this method is depicted in FIG. 3. The method refers to the setup in FIG. 1 where the projection apparatus 1 comprises a storage unit 101, a process unit 103, an output unit 105, a transmission interface 107, an OSD interface 109 and a starting unit ill. The storage unit 101 is configured to store a plurality of speech data, including a plurality of different language groups and speech indication content, while the projection apparatus 1 is connected with a computer 15 via the transmission interface.

This method begins with step 301 where the projection apparatus 1 is powered on and goes into standby. Next, in step 302, the updating of speech data is determined, that is, whether the computer 115 is going to update the speech data of the projection apparatus 1 via the transmission interface 107. If so, the updated speech data are stored into the storage unit 101 in step 303. More specifically, in step 303, the process unit 103 is enabled to receive a speech update signal from the computer 115. In addition, the storage unit 101 is enabled to update the speech data according to the updated speech data from the computer 115 via the transmission interface. Then, the process executes step 302 repeatedly until the computer 115 does not further update the speech data of the projection apparatus 1 via the transmission interface 107.

If the speech will not be updated, the projection apparatus 1 is started up in step 304, after which a speech datum is selected in step 305 according to the present state of the projection apparatus 1. For example, if the projection apparatus 1 is powering on, a corresponding speech datum is selected, such as "turning on." Subsequently, the selected speech datum is outputted to indicate the present state to the user in step 306. Then, in step 307, one language group is selected via the language menu 200 of the OSD screen 109, so that at least one selected speech datum can be outputted by the output unit 105 according to the selected language group. For example, if Chinese is selected via the language menu 200, the output unit 105 outputs the speech data in Chinese.

It should be noted that the speech datum selected in step 305 is pre-stored in step 307 of the last cycle which in turn is selectively performed by the user. That is, when the language group is chosen, the desired language group is selected via the language menu 200 of the OSD 109. Furthermore, step 307 may be performed after the projection apparatus 1 is started and before further execution of any step. Moreover, the sequence in which the aforesaid steps are executed is not intended to limit the scope of this invention, and those skilled in the art can alter this sequence without departing from the spirit of this invention.

According to the aforementioned descriptions, the user can be informed immediately of the present state of the projection apparatus of the invention and continue with subsequent operations, regardless of the projection apparatus's mounting location.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus with speech indication, being electrically connected to a computer, the projection apparatus comprising:

a starting unit;

a storage unit being configured to store a plurality of speech data, wherein the plurality of the speech data comprise a plurality of different language groups and various speech indication content;

a transmission interface being configured to connect to the computer for accessing the storage unit, wherein the storage unit obtains an update speech data from the computer through the transmission interface;

a process unit being configured to select at least one of the speech data according to a present state of the projection apparatus; and an output unit being configured to output the at least one selected speech data to broadcast at least one speech for indicating a user of the projection apparatus so that the user can be informed of the present state of the projection apparatus through speech indications, regardless of the projection apparatus's mounting locations;

wherein the output unit comprises a speaker, the projection apparatus is not started by the starting unit when the speech data in the storage unit is updated by the computer, and the starting unit starts the projection apparatus when the computer does not update the speech data via the transmission interface.

2. The projection apparatus as claimed in claim 1, wherein the projection apparatus further comprises an on-screen display for the user to select one of the language groups.

3. The projection apparatus as claimed in claim 1, wherein the speech data are in digital forms, the process unit is configured to transform the selected speech data into analog forms, and the output unit is configured to broadcast the transformed selected speech data.

4. The projection apparatus as claimed in claim 3, wherein the process unit transforms the selected speech data into the analog forms by integration simulation of pulse-width modulation.

5. The projection apparatus as claimed in claim 1, wherein the transmission interface comprises at least one of an RS232 and an universal serial bus.

6. A control method for being applied in a projection apparatus with speech indication, the projection apparatus comprising a storage unit, a process unit, a transmission interface, and an output unit, wherein the transmission interface is connected to a computer and the storage unit is configured to store a plurality of speech data, the control method comprising the steps of:

enabling the process unit to receive an update speech data of the computer;

enabling a starting unit unable to start the projection apparatus when updating the speech data;

enabling the storage unit to update the speech data according to the update speech data from the computer, wherein the storage unit obtains the update speech data from the computer through the transmission interface;

enabling the process unit to select at least one of the speech data according to a state of the projection apparatus, wherein the plurality of the speech data comprise a plurality of different language groups and various speech indication content; and enabling the output unit having a speaker to output the at least one selected speech data to broadcast at least one speech for indicating the user of the projection apparatus so that the user can be informed of the present state of the projection apparatus through speech indications, regardless of the projection apparatus's mounting locations, wherein the starting unit starts the projection apparatus when the computer does not update the speech data via the transmission interface.

7. The control method as claimed in claim 6, wherein the speech data are in digital forms, the control method further comprises the step of enabling the process unit to transform the selected speech data into analog forms, and the step of enabling the output unit to broadcast the transformed selected speech data.

8. The control method as claimed in claim 7, further comprising the step of enabling the process unit to transform the selected speech data into analog forms by the integration simulation of pulse-width modulation.

9. The control method as claimed in claim 6, wherein the control method further comprises the step of selecting one of the language groups to enable the output unit to output the at least one selected speech data according to the selected language group.

10. The control method as claimed in claim 6, wherein the projection apparatus further comprises an on-screen display, and the control method further comprises the step of selecting one of the language groups via the on-screen display.

* * * * *